Sept. 4, 1934.  H. W. DUSINBERRE  1,972,089
CALCULATOR AND DIRECT READING HUMIDITY INDICATOR
Filed Sept. 3, 1932  2 Sheets-Sheet 1
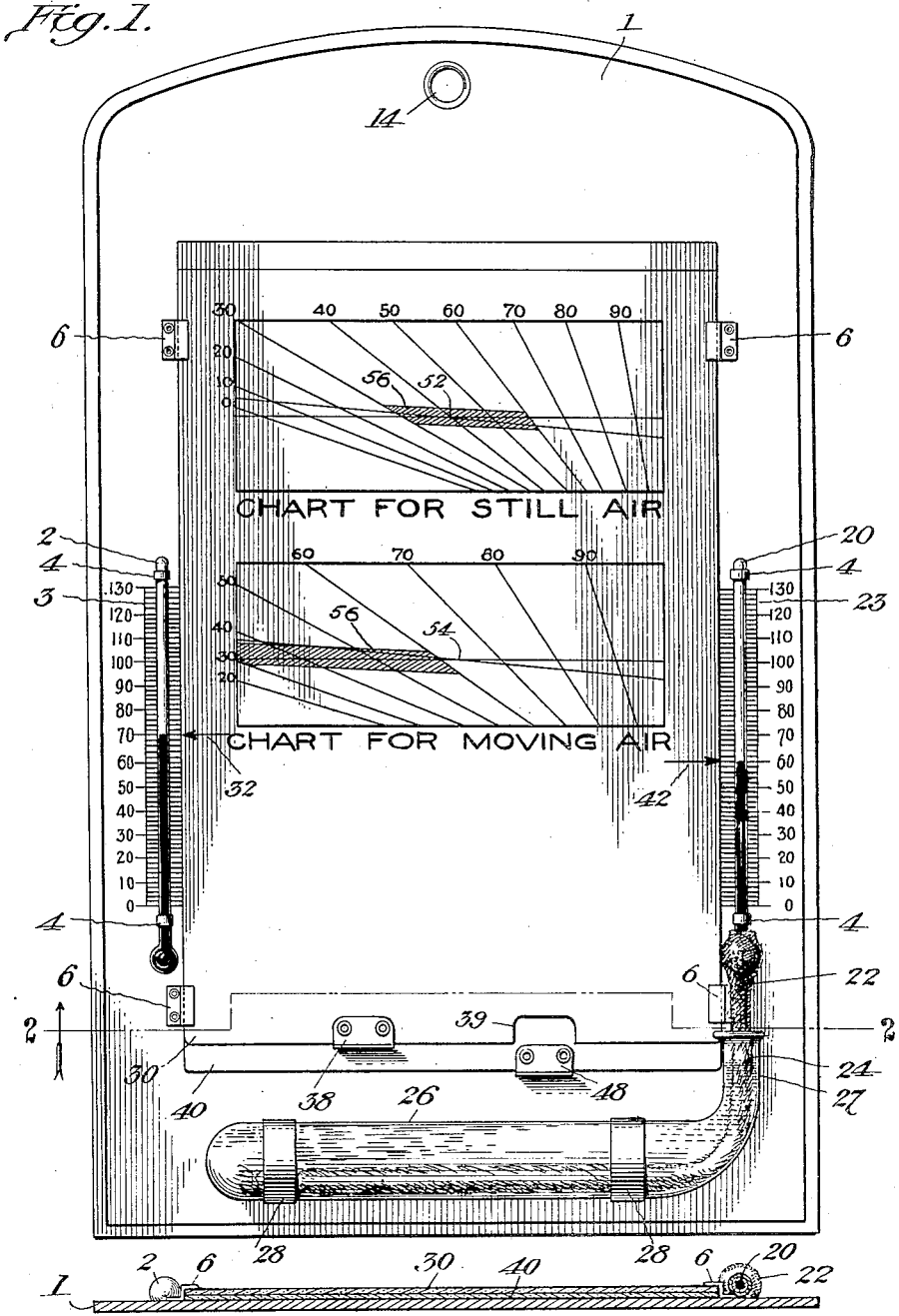
Inventor,
Henry W. Dusinberre.
By Fisher & Pedersen,
Attorneys.

Inventor,
Henry W. Dusinberre
By Fisher Pedersen,
Attorneys.

Patented Sept. 4, 1934

1,972,089

UNITED STATES PATENT OFFICE 1,972,089

CALCULATOR AND DIRECT READING HUMIDITY INDICATOR

Henry W. Dusinberre, Kew Gardens, N. Y.

Application September 3, 1932, Serial No. 631,715

20 Claims. (Cl. 73—24)

This invention relates to a device for determining an unknown value from one or more related known values. It particularly pertains to the construction and operation of a humidity indicator.

In the prior art a large number of varying types of calculators or devices for determining an unknown value from one or more related values have been proposed. These operate on many different principles, but they are for the most part rather cumbersome and difficult to use except by persons who are thoroughly experienced with them. In connection with humidity indicators there have been proposed devices which can be employed to determine the relative humidity from wet and dry bulb temperatures or other known values from which humidity can be determined. These instruments of the prior art are quite complicated and cannot be used by the average person without considerable instruction.

The effect of humidity on the comfort of the individual is known and appreciated by the public generally but present methods of determination involving the use of sling psychrometers, calculation and interpretation from psychrometric tables are either too difficult or too troublesome to interest the average individual. The desirability or necessity of controlling the humidity where possible is recognized. In artificially heated rooms, for instance, it is usually necessary to evaporate considerable quantities of water because the heating of air decreases its relative humidity, thereby increasing evaporation from the body and having a cooling effect. Conversely with modern cooling units if warm summer air of usual high humidity is cooled the relative humidity is increased causing damp air and in many cases actual condensation of moisture on various objects in the room. Since it is possible in many instances to control the humidity, i. e., increase it when air is heated and decrease it when air is cooled, or vary it at constant temperature, it is desirable that some instrument be provided which can be operated by anyone with a minimum amount of instruction and with assurance of rapidly securing accurate results.

It is, therefore, an object of this invention to provide a device for determining an unknown value from known values.

It is also an object to provide an instrument for directly determining relative humidity from wet and dry bulb temperatures.

It is a further object to construct a humidity indicator which is complete in itself, including wet and dry bulb thermometers and a calculating device in connection therewith by means of which the relative humidity can be determined directly from the readings on the respective thermometers.

A still further object is to provide a chart in connection with the humidity indicator that shows the conditions of temperature and humidity which are most comfortable.

With these and other objects in view which will be apparent from the sequent description the present invention comprises the various devices and arrangements hereinafter more fully described and more particularly defined in the claims.

Referring now to the drawings, wherein like numerals refer to similar parts in the several figures:

Fig. 1 is a front view of the complete instrument;

Fig. 2 is a cross section through the line 2—2 in Fig. 1;

Figure 5:
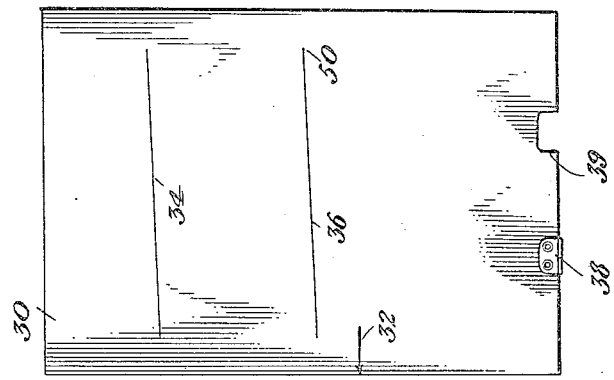
Fig. 5 is a front view of the slidable transparent member which cooperates with the dry bulb thermometer.

Referring particularly to Fig. 1, numeral 1 designates a base of generally rectangular shape which may be composed of wood, card-board, fibre-board, synthetic resin or any other suitable material which can be used for mounting the other members hereinafter described as mounted thereon. Numeral 2 is a thermometer provided with a scale 3 calibrated to give temperature readings in centigrade or Fahrenheit as desired from which can be determined the temperature and which may be printed on the base 1 or may be an independent member suitably secured thereto. The thermometer 2 is mounted on the base 1 by means of encircling clips 4 spaced at suitable intervals along the tube of the thermometer. Near the opposite edge of the base 1 from thermometer 2 is a wet bulb thermometer 20 also secured to the base 1 by encircling clips 4 and mounted in connection with a scale 23. The wet bulb thermometer 20 is provided with a wick 22 surrounding the bulb of the thermometer and kept wet through the capillary rise of water 24 contained in a suitable vessel such as a test tube 26 with a restricted opening 27 and mounted near the bottom of the base 1 by encircling bands 28.

Figure 4:
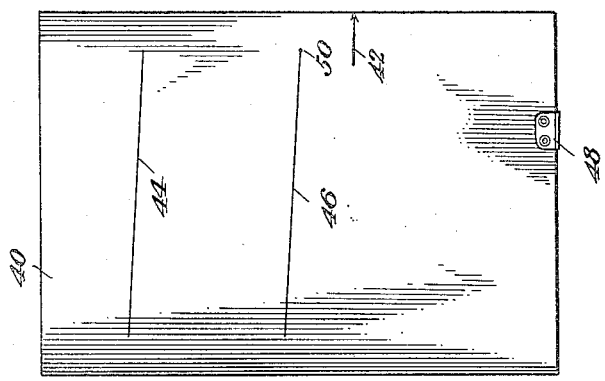
Fig. 4 is a front view of the slidable transparent member which cooperates with the wet bulb thermometer.
Figure 3:
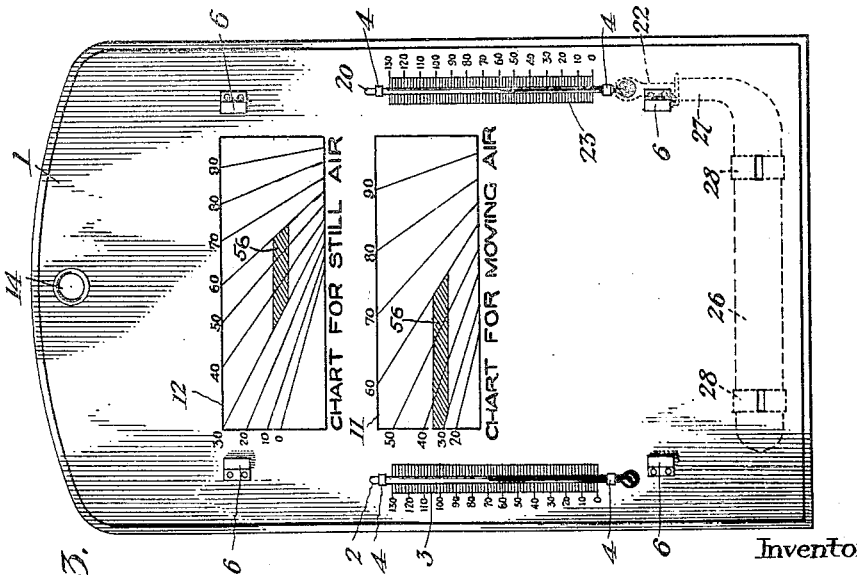
Fig. 3 is a front view of the base of the instrument showing the charts, scales and thermometers.

Between the thermometers are two slidable members 30 and 40 in the form of normally superposed substantially rectangular transparent sheets, shown in Figs. 4 and 5. These sheets are held in position by guides 6, under which the two members 30 and 40 are free to slide. The member 30 has an arrow or other pointer 32 which cooperates with the scale 3 of the dry bulb thermometer. There are also on the transparent member 30 two diagonal cross-lines 34 and 36 (Fig. 5). Transparent member 40 has an arrow or other pointer 42 which cooperates with the scale 23 on the wet bulb thermometer 20 and also has cross-lines 44 and 46 (Fig. 4). In order to slide and set the transparent members 30 and 40, a finger clip 48 is provided at the bottom of the slidable transparent member 40 and a like clip 38 provided on transparent slidable member 30. A portion 39 may be cut out of member 30 to permit the angular part of clip 48 to slide therein.

The members 30 and 40 in the preferred embodiment are described and illustrated as made of a transparent material such as celluloid but instead of being transparent an open framework could be employed with wires or bars to form the cross lines. A further method of construction might involve the use of slits in opaque slidable members in which case the chart or charts would have to be calibrated in numbers instead of lines. Although in Fig. 2 member 40 is next to the base their relative positions are immaterial. In a humidity indicator the wet bulb temperature never exceeds that of the dry bulb but in calculations where either reading may be the higher other handles more appropriate than finger clips 38 and 48 may be employed or the opening 39 lengthened.

Also on base 1 below the two transparent members, is a chart 11, which in the drawings is calibrated for relative humidity when the wet bulb temperature is taken for moving air and a chart 12 which is likewise calibrated for relative humidity but for still air. These charts, the use and calibration of which will be hereinafter more specifically considered, may be printed directly on the base 1 or printed on some other suitable material and affixed to the base as in the case of the scales 3 and 23.

In order that the instrument may be hung upon the wall, an opening 14 near the top of the base 1 may be provided for a hook or wire. Other suitable devices such as easel pegs or hinged supports may be employed to keep the instrument in a generally upright position to prevent spilling the liquid contained in the tube 26.

The scales and charts illustrated in the drawings are those to be used in connection with the device as a humidity indicator. For other calculations the thermometers could be omitted while the scales and charts could be suitably changed according to the need presented, but the operation would be substantially the same as in the case of the humidity indicator.

The device when employed as a humidity indicator is calibrated by placing an arrow 32 on the member 30 at a suitable position such as indicated in the drawings. At about the same position an arrow 42 is placed upon the member 40. These two arrows are then set at the same temperature on their respective scales. When this has been accomplished a line 36 is drawn on member 30 from a point such as 50 which indicates 100% humidity on the right extremity of the chart 11 in a downwardly diagonal direction toward the left. When this has been done a line 46 is drawn from the same position 50 but on member 40 in a diagonally upward direction toward the left. The angularity of these lines is not of itself important except that the angle should not be so small as to make an indefinite intersection, nor yet so great as to require an unreasonably small chart.

When this has been done the pointer 32 can be set, for instance, at 100 degrees dry bulb temperature and the arrow 42 set at, for instance, 97 degrees wet bulb temperature, which indicates a relative humidity of 90%. The two lines will then intersect slightly to the left of the point 50 and give a point on the line designated at 90%. One or more additional settings at other wet and dry bulb temperatures which indicate a relative humidity of 90% will furnish the necessary number of points to draw a complete line 90. The procedure is then repeated for 80% and another line 80 will be secured. This is continued until percentages as low as desired or which will be found in normal use have all been located on the chart.

With the chart thus calibrated by simply setting the arrow 32 on the dry bulb temperature or at the top of the column of liquid in thermometer 2 since after the instrument has been calibrated the thermometer scales are not essential to operation and can be dispensed with if desired, and by setting the arrow 42 on the wet bulb temperature, or at the top of the column of liquid in thermometer 20, the intersection of lines 36 and 46 permits the reading of the relative humidity directly from the chart 11. The chart 12 is calibrated in the same fashion as was the chart 11, although in this case humidity tables for still air are employed.

To further increase the usefulness of the device in assisting the proper regulation of the humidity where this is possible, a shaded area 56 may be shown on the charts. This area includes those humidity values which are comfortable to the average individual for different temperatures, and enables the user to know when the most satisfactory and healthful humidity for a given dry bulb temperature has been attained. If a given determination does not show a humidity within this area or "comfort zone" the operator can work back from the dry bulb temperature, if it is to be kept constant, and determine whether the wet bulb temperature should be increased, i. e., more moisture added to the air, or decreased, i. e., the further addition of moisture discontinued or prevented.

As designed in the specific embodiment illustrated an area between the top of chart 12 and hole 14 is provided to be used for the name of the instrument or if the instrument is to be distributed for advertising purposes the name of the distributor could be printed there.

Below the chart 11 and above the tube 26 on the base 1 is an area under the transparent members 30 and 40 on which may be printed the simple directions to use the instrument.

While the above description has been particularly with respect to a relative humidity indicator, it should be clear that the same arrangement could be used for determining other values as, for instance, the scale 3 could indicate volts, the scale 23 could indicate amperes and the chart 11 or 12 calibrated to give direct readings in watts. Other unknown values involving the use of two known related values such as weight of a sample for analysis and weight of precipitate obtained or volume of liquid for titration from which an unknown related value such as percentage of a given component may be computed can be determined through the use of the present instrument.

In the operation of the instrument as a humidity indicator, the tube 26 is partially filled with water 24. The water rises through the wick 22 by capillary action, wetting that portion which surrounds the bulb of the thermometer 20. Since the evaporation of water has a cooling effect the temperature indicated by the thermometer will, except when the humidity is 100%, be less than that of the dry bulb thermometer 2. For a quick determination after the instrument has been standing the transparent member 30 is moved by means of the finger clip 48 until the arrow 32 indicates the temperature shown by the thermometer 2. The transparent member 40 is then moved by the finger clip 48 until the arrow 42 points to the temperature indicated by the wet bulb thermometer. This causes the lines 34 and 44 to intersect at the point designated by numeral 52, which indicates the relative humidity. If a more accurate reading is desired, a breeze is set up against the wet bulb thermometer, as for instance by directing a current of air from an electric fan on it, which increases the rate of evaporation. Then the two pointers 32 and 42 are set at the respective temperatures of the dry and wet bulb thermometers and the relative humidity read by the intersection of the lines 36 and 46 as at the point 54, which indicates the relative humidity.

While the instrument has been described in considerable detail and particularly with respect to a humidity indicator, it is not to be specifically limited to the preferred embodiment shown since various changes in arrangement, structure and materials are contemplated and may be made by those skilled in the art without departing from the spirit of the invention as defined by the appended claims.

I claim as my invention:

1. In a device for determining an unknown value from known values, the combination which comprises a base, a scale for known values on said base, a member movable parallel to said base having a cross-line and an indicator to point to a known value on a scale on said base, a second member movable parallel to said base having a cross-line and an indicator to point to another known value on a scale on said base, said cross-lines being arranged to intersect when the indicators point to known values, and a chart from which can be read the unknown resulting value by the intersection of the lines.

2. In a device for determining an unknown value from known values, the combination which comprises a base, a scale for known values on said base, a slidable member movable parallel to said base having a cross-line and an indicator to point to a known value on a scale on said base, a second slidable member parallel to said base having a cross-line and an indicator to point to another known value on a scale on said base, said cross-lines being arranged to intersect when the indicators point to known values, and a chart from which can be read the unknown resulting value by the intersection of the lines.

3. In a device for determining an unknown value from known values, the combination which comprises a base, a scale for known values on said base, a transparent member movable parallel to said base having a cross-line and an indicator to point to a known value on a scale on said base, a second transparent member movable parallel to said base having a cross-line and an indicator to point to another known value on a scale on said base, said cross-lines being arranged to intersect when the indicators point to known values and a chart from which can be read the unknown resulting value by the intersection of the lines.

4. In a device for determining an unknown value from known values, the combination which comprises a base, a scale for known values on said base, a member movable parallel to said base having a cross-line and an indicator to point to a known value on a scale on said base, a second member movable parallel to said base and in a parallel path to said first movable member also having a cross-line and an indicator to point to another known value on a scale on said base, said cross-lines being arranged to intersect when the indicators point to known values and a chart from which can be read the unknown resulting value by the intersection of the lines.

5. In a device for determining an unknown value from known values, the combination which comprises a base, two parallel scales for known values on said base, a slidable member movable parallel to said base and in a path parallel to said scales having a cross-line and an indicator to point to a known value on one of said scales, a second slidable member movable parallel to said base and in a path parallel to said scales having a cross-line and an indicator to point to another known value on the second scale, said cross-lines being arranged to intersect when the indicators point to known values and a chart from which can be read the unknown resulting value by the intersection of the lines.

6. In an instrument for directly determining relative humidity from wet and dry bulb temperatures, the combination which comprises a base, a thermometer scale on said base, a member movable parallel to said base having a cross-line and an indicator to point to temperature readings on a thermometer scale on said base, a second member movable parallel to said base having a cross-line and an indicator to point to temperature readings on a thermometer scale on said base, said cross-lines being arranged to intersect when the indicators point to wet and dry bulb temperatures on a thermometer scale on said base and a chart from which can be read the relative humidity by the intersection of the lines.

7. In an instrument for directly determining relative humidity from wet and dry bulb temperatures, the combination which comprises a base, a thermometer scale on said base, a slidable member movable parallel to said base having a cross-line and an indicator to point to temperature readings on a thermometer scale on said base, a second slidable member movable parallel to said base having a cross-line and an indicator to point to temperature readings on a thermometer scale on said base, said cross-lines being arranged to intersect when the indicators point to wet and dry bulb temperatures on a thermometer scale on said base and a chart from which can be read the relative humidity by the intersection of the lines.

8. In an instrument for directly determining relative humidity from wet and dry bulb temperatures, the combination which comprises a base, a thermometer scale on said base, a transparent member movable parallel to said base having a cross-line and an indicator to point to temperature readings on a thermometer scale on said base, a second transparent member movable parallel to said base having a cross-line and an indicator to point to temperature readings on a thermometer scale on said base, said cross-lines being arranged to intersect when the indicators point to wet and dry bulb temperatures on a thermometer scale on said base and a chart from which can be read the relative humidity by the intersection of the lines.

9. In an instrument for directly determining relative humidity from wet and dry bulb temperatures, the combination which comprises a base, a thermometer scale on said base, a transparent slidable member movable parallel to said base having a cross-line and an indicator to point to temperature readings on a thermometer scale on said base, a second transparent slidable member movable parallel to said base having a cross-line and an indicator to point to temperature readings on a thermometer scale on said base, said cross-lines being arranged to intersect when the indicators point to wet and dry bulb temperatures on a thermometer scale on said base and a chart from which can be read the relative humidity by the intersection of the lines.

10. In an instrument for directly determining relative humidity from wet and dry bulb temperatures, the combination which comprises a base, a thermometer scale on said base, a member movable parallel to said base having a cross-line and an indicator to point to temperature readings on a thermometer scale on said base, a second member movable parallel to said base and in a path parallel to said first movable member also having a cross-line and an indicator to point to temperature readings on a thermometer scale on said base, said cross-lines being arranged to intersect when the indicators point to wet and dry bulb temperatures on a thermometer scale on said base, guide means common to both members and a chart from which can be read the relative humidity by the intersection of the lines.

11. In an instrument for directly determining relative humidity from wet and dry bulb temperatures, the combination which comprises a base, two parallel thermometer scales on said base, a slidable member movable parallel to said base and in a path parallel to said scales having a cross-line and an indicator to point to one thermometer scale, a second slidable member movable parallel to said base and in a path parallel to said scales having a cross-line and an indicator to point to temperature readings on the other thermometer scale, said cross-lines being arranged to intersect when the indicators point to wet and dry bulb temperatures on the thermometer scales on said base and a chart from which can be read the relative humidity by the intersection of the lines.

12. In an instrument for directly determining relative humidity from wet and dry bulb temperatures, the combination which comprises a base, a thermometer on said base, a member movable parallel to said base having a cross-line and an indicator to point to the top of the column of liquid on a thermometer on said base, a second member movable parallel to said base and in a path parallel to said first movable member also having a cross-line and in indicator to point to the top of the column of liquid on a thermometer on said base, said cross-lines being arranged to intersect when the indicators point to wet and dry bulb temperatures on a thermometer on said base and a chart from which can be read the relative humidity by the intersection of the lines.

13. An instrument for directly determining relative humidity from wet and dry bulb temperatures, which comprises a base, a dry bulb thermometer mounted thereon, a wet bulb thermometer mounted thereon, a slidable member movable parallel to said base having an indicator to point to the position of the fluid in the dry bulb thermometer and having a cross-line, a slidable member movable parallel to said base and said first mentioned slidable member having an indicator to point to the position of the fluid in the wet bulb thermometer and having a cross-line, said lines being arranged to intersect when the indicators point to wet and dry bulb temperatures on the thermometers on said base and a chart from which can be read the relative humidity by the intersection of the lines.

14. An instrument for directly determining relative humidity from wet and dry bulb temperatures, which comprises a base, a dry bulb thermometer mounted thereon, a wet bulb thermometer mounted thereon, a transparent member movable with respect to the base and the dry bulb thermometer having an indicator to cooperate with the dry bulb thermometer and having a cross-line, a second transparent member movable with respect to the base and the wet bulb thermometer having a pointer to cooperate with the wet bulb thermometer and having a cross-line, said cross-lines being arranged to intersect when the pointers cooperate with the dry and wet bulb thermometers, and a chart on said base member from which can be read the relative humidity by the intersection of the lines.

15. An instrument for directly determining relative humidity, which comprises a base, a dry bulb thermometer mounted thereon, a wet bulb thermometer mounted thereon, a transparent member slidable with respect to said base member having an indicator to point to the position of the fluid in the dry bulb thermometer and having a cross-line, a transparent member slidable with respect to said base and said first mentioned transparent member having an indicator to point to the position of the fluid in the wet bulb thermometer and having a cross-line, said lines being so arranged as to intersect when the pointers indicate the positions of the fluid in the dry and wet bulb thermometers, means for mounting the transparent members in slidable relation to said base member and to each other and a chart on said base member from which can be read the relative humidity by the intersection of the lines on the transparent slidable members.

16. In an instrument for directly determining relative humidity from wet and dry bulb temperatures, the combination which comprises a base, a dry bulb thermometer provided with a scale on said base, a wet bulb thermometer provided with a scale on said base parallel to said dry bulb thermometer, a slidable transparent member movable parallel to said base and in a path parallel to said dry bulb thermometer having a cross line and an indicator to point to the temperature reading of the dry bulb thermometer, a slidable transparent member movable parallel to said base and in a path parallel to said wet bulb thermometer having a cross-line and an indicator to point to the temperature reading of the wet bulb thermometer, said cross-lines being arranged to intersect when the indicators point to the wet and dry bulb temperature readings on the respective thermometers, and a chart from which can be read the relative humidity by the intersection of the lines and the relative degree of personal comfort from the temperatures and humidity.

17. A humidity indicator comprising a chart calibrated to read in percentage of humidity, two members, settable according to dry and wet bulb temperatures, respectively, and having cross-lines adapted to intersect over said chart, said chart having an area thereon for indicating a comfort zone wherein the humidity and temperature are comfortable.

18. A humidity indicator, comprising in combination an indicator settable in accordance with the temperature, an indicator settable in accordance with humidity, a chart, said indicators being arranged to intersect over said chart, the chart being calibrated to indicate a comfort zone, in which the humidity and temperature are comfortable.

19. A humidity indicator, comprising in combination an indicator settable in accordance with the temperature, an indicator settable in accordance with humidity, said indicators comprising relatively slidable flat members carrying cross lines, a chart, said cross lines being arranged to intersect over said chart, the chart being calibrated to indicate a comfort zone, in which the humidity and temperature are comfortable.

20. In an instrument for directly determining relative humidity from wet and dry bulb temperature indications, the combination which comprises a base, a dry bulb thermometer mounted in a fixed position on said base, a member slidably mounted on said base to permit adjusting the position of the said member in accordance with the indication of the dry bulb thermometer, said member being provided with a line settable according to the indication of the dry bulb thermometer to determine the effective points on a chart, a wet bulb thermometer immovably mounted on said base, a chart, means adapted to register with the indication of the wet bulb thermometer cooperating with the effective points on the chart as determined by the line settable according to the dry bulb indication thereby giving a reading on said chart of the relative humidity.

HENRY W. DUSINBERRE.